(12) United States Patent
Wang et al.

(10) Patent No.: US 8,756,192 B2
(45) Date of Patent: Jun. 17, 2014

(54) DISPATCHING CONFLICTING DATA CHANGES

(75) Inventors: Rui Wang, Redmond, WA (US); Michael Habben, Sammamish, WA (US); Qun Guo, Bellevue, WA (US); Artem Oks, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 711 days.

(21) Appl. No.: 12/683,440

(22) Filed: Jan. 7, 2010

(65) Prior Publication Data

US 2011/0167038 A1 Jul. 7, 2011

(51) Int. Cl.
*G06F 17/30* (2006.01)

(52) U.S. Cl.
USPC ............................ 707/610; 707/626; 707/634

(58) Field of Classification Search
None
See application file for complete search history.

(56) References Cited

U.S. PATENT DOCUMENTS

| | | | |
|---|---|---|---|
| 6,012,059 A | 1/2000 | Neimat et al. | |
| 6,980,988 B1 * | 12/2005 | Demers et al. | 1/1 |
| 7,240,054 B2 | 7/2007 | Adiba et al. | |
| 2005/0192989 A1 * | 9/2005 | Adiba et al. | 707/101 |
| 2006/0218210 A1 | 9/2006 | Sarma et al. | |
| 2007/0282915 A1 | 12/2007 | Vosshall et al. | |
| 2008/0027987 A1 * | 1/2008 | Arora et al. | 707/104.1 |
| 2008/0163222 A1 * | 7/2008 | Bourbonnais et al. | 718/101 |

OTHER PUBLICATIONS

"Causal Weak-Consistency Replication—A Systems Approach", Retrieved at <<http://edoc.hu-berlin.de/dissertationen/hupfeld-felix-2009-01-28/PDF/hupfeld.pdf>>,Jan. 2009, pp. 129.
Saito, et al., "Replication: Optimistic Approaches", Retrieved at <<http://www.hpl.hp.com/techreports/2002/HPL-2002-33.pdf>>, Feb. 8, 2002, pp. 40.
Saito, et al. , "Optimistic Replication", Retrieved at << http://www.cs.cmu.edu/~15-610/READINGS/optional/saito05.pdf>>, ACM Computing Surveys, vol. 37, No. 1, Mar. 2005, pp. 42-81.
Theel, et al. , "Static and Dynamic Adaptation of Transactional Consistency", Retrieved at <<ftp://ftp.inria.fr/INRIA/publication/publi-pdf/RR/RR-2999.pdf>>, Oct. 1996, pp. 33.

* cited by examiner

*Primary Examiner* — Ajay Bhatia
*Assistant Examiner* — Miranda Huang
(74) *Attorney, Agent, or Firm* — Nicholas Chen; Kate Drakos; Micky Minhas (57) ABSTRACT

A method for distributing one or more conflicting data changes. The method includes extracting data changes from the source site log, and applying the data changes to the destination site. The method then includes identifying one or more constraints for each data change and generating a hash value for each identified constraint. The method then dispatches the data changes into a plurality of streams based on the hash values. The hash values are used to identify conflicting data changes and determine how the data changes should be sent through the plurality of streams such that data changes are applied in parallel in the plurality of streams without violating any causal consistency constraints. The method then includes committing data changes in the plurality of streams to the destination site in a single transaction, creating a consistent transactional view.

15 Claims, 3 Drawing Sheets

DISPATCHING CONFLICTING DATA CHANGES

BACKGROUND

Replication is the ability to track, dispatch and apply data changes from one database to another. In a Relational Database Management System (RDBMS), data changes in a database are naturally logged for recovery purposes. System metadata for replication determines what data are being changed and the changes that are to be replicated. The data to be replicated may include the whole database, entire tables, selected rows from tables, specified columns from tables or stored procedures. The data changes in the log may then be marked for replication. The data changes may be split into consecutive log ranges such that each log range of data changes are replicated to the destination site in one batch. In conventional transactional replication, data changes are typically dispatched from a source site and applied at a destination site through a single connection or stream. While a single stream ensures that the data changes are applied at the destination site in the same order as the source site to maintain transactional consistency, there are throughput limitations that can occur due to this method.

In order to avoid these throughput limitations, replication is performed using multiple streams (i.e., multi-streaming) such that the data changes are applied in parallel at the destination site. This parallelism leads to higher throughput and performance for the system as a whole. When performing replication using a multi-streaming approach, the data changes within a batch are dispatched into multiple distinct streams based on a predefined hashing key. Consequently, the data changes that are dispatched in different streams may be applied at the destination site in a different order from which they were performed at the source site. Applying data changes out of order may violate one or more causal consistency constraints among conflicting data changes. Examples of causal consistency constraints include primary key constraints, unique constraints and foreign key constraints.

SUMMARY

Described herein are implementations of various technologies for dispatching conflicting data changes into multiple streams. Conflicting data changes may refer to two or more data changes that involve the same causal consistency constraints and would violate these causal consistency constraints if they were applied out of order at the destination site. In one implementation, a computer application may receive a log from a source site that includes a number of data changes and the order of the corresponding data changes that may be applied at a destination site. The computer application may then extract all of the data changes from the log. After extracting the data changes from the log, the computer application may generate a set of hash values such that each constraint in each data change has a hash value.

In generating the set of hash values, the computer application may use a hash function to create a hash value for each constraint. The computer application may then concatenate all of the hash values for one data change into a binary string and associate this binary string with its corresponding data change from the log.

In one implementation, the source site and the destination site may be connected to each other by multiple streams. Initially, if all of the streams connecting the source site to the destination site are empty, the computer application may dispatch non-conflicting data changes evenly into multiple streams following the order as indicated in the log. After the data changes have been dispatched but before the data changes have been committed at the destination site, the computer application may maintain a hash table to keep track of the data changes that have been dispatched. Each entry in the hash table may include a constraint hash value, a constraint identification (ID) and the ID of the stream in which the data change has been dispatched.

In one implementation, before dispatching a subsequent data change, the computer application may search the hash table to determine whether an entry in the hash table has the same constraint ID and the same constraint hash value (i.e., constraint pair) of the subsequent data change. If the computer application does not find a matching entry in the hash table, the computer application may dispatch the subsequent data change into a stream such that the data changes are evenly distributed into the multiple streams. When the subsequent data change is dispatched, the computer application may add the subsequent data change's constraint ID, constraint hash value and stream ID as a new entry into the hash table.

If, however, the computer application finds a matching entry in the hash table, the computer application may determine that the subsequent data change and the data change related to the constraint ID and the constraint hash value in the matching entry are conflicting. The computer application may then dispatch the subsequent data change into the same stream where the matching entry's data change was dispatched to ensure that the two data changes are performed in their original relative order.

In one implementation, the subsequent data change may conflict with more than one entry in the hash table. In this case, the computer application may dispatch conflicting data changes into different streams, but the computer application may throttle the stream of the subsequent data change to avoid violating any constraint. By throttling the stream of the subsequent data change, the computer application may ensure that the prior data changes occur before the subsequent data change such that the data changes are performed at the destination in the correct order. In any of the implementations described above, all of the data changes dispatched into various streams in one batch may be delivered to the destination site in a single transaction and therefore applied together.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In general, one or more implementations described herein are directed to dispatching conflicting data changes into multiple streams. Various techniques for dispatching conflicting data changes into multiple streams will be described in more detail with reference to FIGS. 1-3.

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 1:
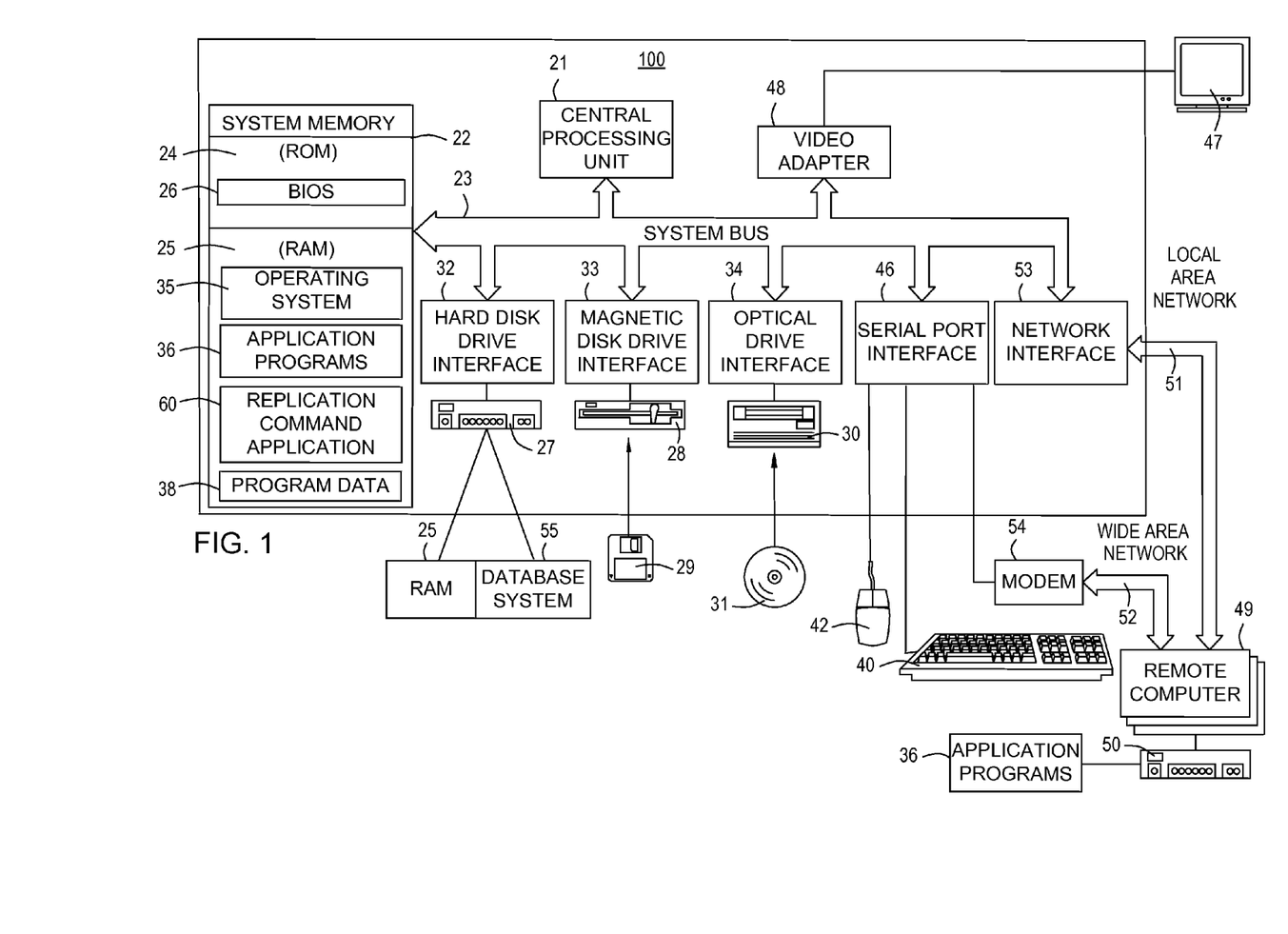
FIG. 1 illustrates a schematic diagram of a computing system in which the various techniques described herein may be incorporated and practiced.

FIG. 1 illustrates a schematic diagram of a computing system 100 in which the various technologies described herein may be incorporated and practiced. Although the computing system 100 may be a conventional desktop or a server computer, as described above, other computer system configurations may be used.

The computing system 100 may include a central processing unit (CPU) 21, a system memory 22 and a system bus 23 that couples various system components including the system memory 22 to the CPU 21. Although only one CPU is illustrated in FIG. 1, it should be understood that in some implementations the computing system 100 may include more than one CPU. The system bus 23 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 22 may include a read only memory (ROM) 24 and a random access memory (RAM) 25. A basic input/output system (BIOS) 26, containing the basic routines that help transfer information between elements within the computing system 100, such as during start-up, may be stored in the ROM 24.

The computing system 100 may further include a hard disk drive 27 for reading from and writing to a hard disk, a magnetic disk drive 28 for reading from and writing to a removable magnetic disk 29, and an optical disk drive 30 for reading from and writing to a removable optical disk 31, such as a CD ROM or other optical media. The hard disk drive 27, the magnetic disk drive 28, and the optical disk drive 30 may be connected to the system bus 23 by a hard disk drive interface 32, a magnetic disk drive interface 33, and an optical drive interface 34, respectively. The drives and their associated computer-readable media may provide nonvolatile storage of computer-readable instructions, data structures, program modules and other data for the computing system 100.

Although the computing system 100 is described herein as having a hard disk, a removable magnetic disk 29 and a removable optical disk 31, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk 27, magnetic disk 29, optical disk 31, ROM 24 or RAM 25, including an operating system 35, one or more application programs 36, a replication application 60, program data 38, and a database system 55. The operating system 35 may be any suitable operating system that may control the operation of a networked personal or server computer, such as Windows® XP, Mac OS® X, Unix-variants (e.g., Linux® and BSD®), and the like. The replication application 60 will be described in more detail with reference to FIGS. 2-3 in the paragraphs below.

A user may enter commands and information into the computing system 100 through input devices such as a keyboard 40 and pointing device 42. Other input devices may include a microphone, joystick, game pad, satellite dish, scanner, or the like. These and other input devices may be connected to the CPU 21 through a serial port interface 46 coupled to system bus 23, but may be connected by other interfaces, such as a parallel port, game port or a universal serial bus (USB). A monitor 47 or other type of display device may also be connected to system bus 23 via an interface, such as a video adapter 48. In addition to the monitor 47, the computing system 100 may further include other peripheral output devices such as speakers and printers.

Further, the computing system 100 may operate in a networked environment using logical connections to one or more remote computers 49. The logical connections may be any connection that is commonplace in offices, enterprise-wide computer networks, intranets, and the Internet, such as local area network (LAN) 51 and a wide area network (WAN) 52. When using a LAN networking environment, the computing system 100 may be connected to the local network 51 through a network interface or adapter 53. When used in a WAN networking environment, the computing system 100 may include a modem 54, wireless router or other means for establishing communication over a wide area network 52, such as the Internet. The modem 54, which may be internal or external, may be connected to the system bus 23 via the serial port interface 46. In a networked environment, program modules depicted relative to the computing system 100, or portions thereof, may be stored in a remote memory storage device 50. It will be appreciated that the network connections shown are exemplary and other means of establishing a communications link between the computers may be used.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 2:
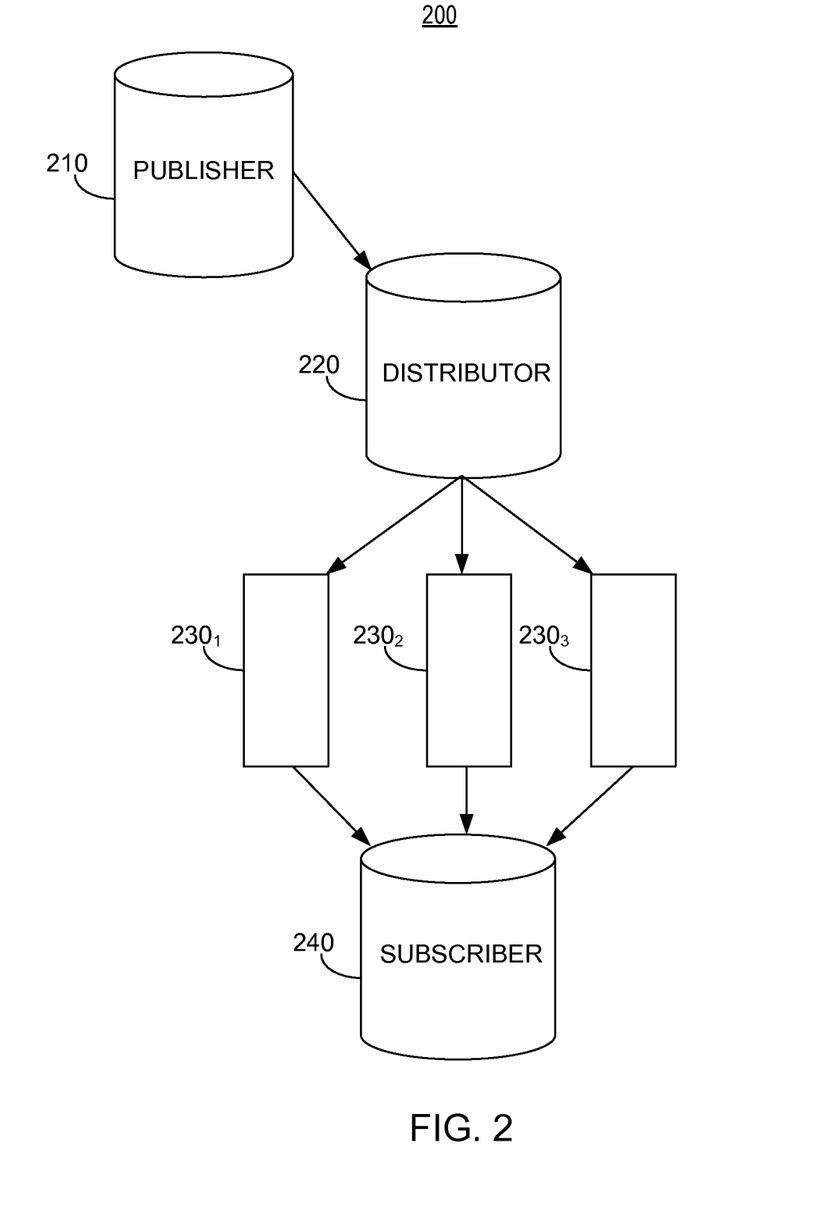
FIG. 2 illustrates a schematic diagram of a transactional replication system in which the various techniques described herein may be incorporated and practiced.

FIG. 2 illustrates a schematic diagram of a transactional replication system in which the various techniques described herein may be incorporated and practiced. In one implementation, the replication system 200 may include a publisher 210, a distributor 220, one or more streams 230 and a subscriber 240. The publisher 210 may be a server or database that sends its data to another server or database. The publisher 210 may contain publication/publications that are a collection of one or more articles that are sent to a subscriber server or database. In transactional replication, an article is what is to be replicated, and may be an entire table, select rows from a table, specified columns from a table or a stored procedure.

The distributor 220 may manage the flow of data through the replication system 200. The distributor 220 may contain a distribution database that tracks the changes (to publications) that need to be replicated from publishers 210. In one implementation, the publisher 210 may act as its own distributor 220. In another implementation, a remote database server may be used to hold the distribution database.

The subscriber 240 may be a server or database that receives data from the publisher 210 or any other database. A subscription is the group of data that a server or database on the subscriber 240 will receive. The subscription may include one or more publications. Further, the subscriptions may be push or pull subscriptions. A push subscription is a subscription when the publishing server will periodically push transactions out to the subscribing server or database. A pull subscription is subscription when the subscribing server will periodically connect to the distribution database and pull information.

In a conventional replication system, data changes are typically applied through a single connection between the distributor 220 and the subscriber 240. While the single connection may ensure that the transactions will be applied at the subscriber in the exact order as the transactions occur on the publisher 210, there may be performance losses with this method because the subscriber 240 may be under-utilized, especially when requests are from a heavily loaded publisher 210.

The replication system 200 in FIG. 2 may overcome some of the limitations of the conventional transactional replication system by utilizing multiple streams 230 at the subscriber 240 to apply the data changes. In one implementation, the distributor 220 may store the data changes it received from the publisher 210 in a command queue. The distributor 220 may then read and sort through the data changes and send the data changes to any of the streams 230 that may connect the distributor 220 to the subscriber 240.

As mentioned above, when sending data changes to different streams 230, the data changes may be applied at the subscriber 240 in a different order from which they were stored in the command queue. In one implementation, applying data changes out of order may violate one or more causal consistency constraints among conflicting data changes. Descriptions of causal consistency constraints such as a primary key constraint, a unique constraint and a foreign key constraint are provided below.

Primary Key Constraint Violation

In one example of a constraint violation, a table "tab1" may have a primary key "k1" on column "k" of the table "tab1". The data changes may include deleting a row with the primary key "k1" and then inserting the primary key "k1" again on the table "tab1." Accordingly, the data changes may be as follows:

---

. . .
delete from tab1 where k = k1
. . .
insert tab1 values(k1, . . . )
. . .

---

As shown above, the two data changes conflict because both data changes act on the primary key column value "k1". In this manner, if the "delete from tab1 where k=k1" data change and the "insert tab1 values(k1, . . . )" data change are dispatched into different streams, it is possible that the "insert tab1 values(k1, . . . )" data change may be applied before the "delete from tab1 where k=k1" data change. In this case, a primary key violation will occur because the primary key "k1" already exists in the primary key column "k."

Unique Constraint Violation

In another example of a constraint violation, a table "tab1" may have a primary key on column "k" and a unique key constraint on column "x." For example, the data changes may include updating the primary key of row (k1, . . . , x1, . . . ) from "k1" to "k2." In this example, the update data change is equivalent to a delete data change followed by an insert data change, that is, a "delete from tab1 where k=k1" data change should be executed before a "insert tab1 values (k2, . . . , x1, . . . )" data change is executed, as shown below.

---

. . .
delete from tab1 where k = k1 /*row (k1, . . . , x1, . . . )
insert tab1 values (k2, . . . , x1, . . . )
. . .

---

These two data changes, however, conflict because both data changes act on the unique constraint column value "x1". A unique constraint violation may occur if the "delete from tab1 where k=k1" data change and the "insert tab1 values (k2, ..., x1, ...)" data change are dispatched into different streams. In this case, the "insert tab1 values (k2, ..., x1, ...)" data change may be applied before the "delete from tab1 where k=k1" data change. Here, since "x1" will already exist in the table "tab1," if the "insert tab1 values (k2, ..., x1, ...)" data change is applied before the "delete from tab1 where k=k1" data change is applied, a unique constraint violation will occur.

Foreign Key Constraint Violation

In yet another example of a constraint violation, a table "tab1" may have a primary key on column "k" and a foreign key column "x." The foreign key column "x" in table "tab1" refers to the primary key column "x" of a table "tab2." In the data changes provided below, a row (x1, ...) is inserted into the table "tab2" and then a row (k1, ..., x1, ...) is inserted into table "tab1."

```
...
insert tab2 values(x1, ...)
insert tab1 values (k1, ..., x1, ...)
...
```

These two data changes, however, conflict because the column "x" in table "tab1" has a foreign key reference that is dependent on column "x" in table "tab2." A foreign key constraint violation may occur when the "insert tab2 values (x1, ...)" data change and the "insert tab1 values (k1, ..., x1, ...)" data change are dispatched into different streams. For instance, the "insert tab1 values (k1, ..., x1, ...)" data change may be applied before the "insert tab2 values(x1, ...)" data change. If the "insert tab1 values (k1, ..., x1, ...)" data change is applied before the "insert tab2 values(x1, ...)" data change, a foreign key constraint violation will occur because row(x1, ...) does not exist in the table "tab2."

A similar situation occurs for the following delete case:

```
...
delete from tab1 where k = k1 /*row (k1, ..., x1, ...) is deleted*/
delete from tab2 where x = x1
...
```

If these two data changes are applied in the reverse order, a foreign key constraint violation will occur because the table "tab1" has a foreign key constraint with reference to the row x1 in the table "tab2." If x1 is deleted from the table "tab2" before the "delete from tab1 where k=k1" data change is applied, a foreign key constraint violation will occur because the row (k1, ..., x1, ...) still refers to the row x1 in the table "tab2."

Figure 3:
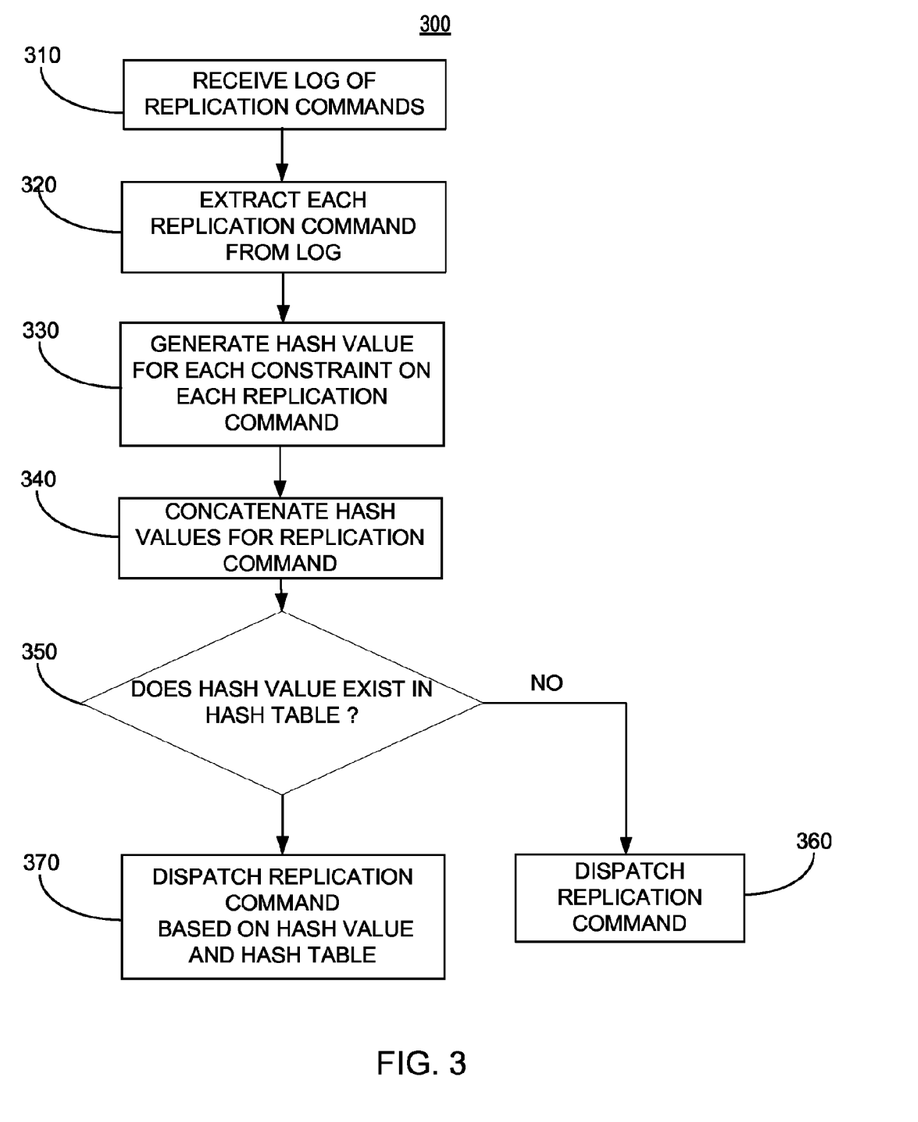
FIG. 3 illustrates a flow diagram of a method for dispatching conflicting data changes into multiple streams in accordance with one or more implementations of various techniques described herein.

FIG. 3 illustrates a flow diagram of a method for dispatching conflicting data changes into multiple streams in accordance with one or more implementations of various techniques described herein. The following description of method 300 is made with reference to computing system 100 of FIG. 1 and the replication system 200 of FIG. 2. It should be understood that while the method 300 indicates a particular order of execution of the operations, in some implementations, certain portions of the operations might be executed in a different order. In one implementation, the method for dispatching conflicting data changes may be performed by the replication application 60.

At step 310, the replication application 60 may receive a log from a source site that includes all of the data changes and the order of the data changes that may be applied at a destination site. The log may include the logical data changes performed at the source site. In one implementation, the source site may be the publisher 210 and the destination site may be the subscriber 240. As such, the replication application 60 may be stored in the distributor 220.

At step 320, the replication application 60 may extract all of the data changes from the log received at step 310. After extracting the data changes from the log, at step 330, the replication application 60 may generate a hash value for each constraint in each data change extracted from the log. In one implementation, a table marked for replication may have a primary key constraint, a unique constraint, a foreign key constraint or combinations thereof. As such, for an "insert" or "delete" data change, the replication application 60 may generate one or more hash values for each constraint using a hash algorithm. The hash algorithm may be configured to generate the same hash value for two or more identical constraints. For example, if a first data change (e.g., delete k1 from column k in table 1) has a primary key constraint on column k of table 1, the replication application 60 may generate a hash value for the primary key constraint with respect to the column k and table 1. Then, if a second data change (e.g., insert k1 into column k of table 1) also has a primary key constraint on column k of table 1, the replication application 60 may generate an identical hash value for the second data change as it did for the first data change. In this manner, the replication application 60 may be able to determine whether two or more data changes are conflicting by identifying whether the data changes have the same hash values. In order to generate the hash values, all column values of the primary key constraint, the unique constraint and the foreign key constraint may be logged into the computer system 100.

In one implementation, the replication application 60 may generate hash values for an "update" data change as follows. If no primary key columns are modified, the replication application 60 may generate one hash value for the primary key constraint. If, however, a column of the primary key constraint is modified, the replication application 60 may log both pre- and post-images of all column values of the primary key constraint. The replication application 60 may generate a first hash value for the pre-image and a second hash value for the post-image of the modified primary key constraint.

If a column of a unique constraint is modified, the replication application 60 may log both pre- and post-images of all column values of the unique constraint in the computer system 100. The replication application 60 may then generate a first hash value for the pre-image and a second hash value for the post-image of this unique constraint.

If a column of a foreign key constraint is modified, the replication application 60 may log both pre- and post-images of all column values of the foreign key constraint in the computer system 100. The replication application 60 may then generate a first hash value for the pre-image and a second hash value for the post-image of this foreign key constraint.

At step 340, the replication application 60 may concatenate all of the hash values generated for a single data change into a binary string. The replication application 60 may then associate the binary string with the single data change. In one implementation, the replication application 60 may concatenate the hash values such that the first part of the binary string may include the number of primary key constraint hash values, the number of unique constraint hash values and the number of foreign key constraint hash values that were generated for the corresponding data change. The second part of the binary string may include an identification number (ID) of the table to which the data change is directed and the hash values corresponding to the column values of the primary key constraints. The third part of the binary string may include an ID of the unique constraint and the hash values corresponding to the column values of the unique constraint. In one implementation, the binary string may not include a unique constraint if the data change does not have a unique constraint. The fourth part of the binary string may include the ID of the table being referenced by a foreign key constraint and the hash values corresponding to the column values of the foreign key constraint. In one implementation, the binary string may not include a foreign key constraint if the data change does not have a foreign key constraint.

At step 350, the replication application 60 may determine whether the hash values generated at step 330 exist in a hash table. The hash table may include a record of the data changes that may have been dispatched into one or more streams. In one implementation, each entry in the hash table may include a constraint hash value, a constraint ID and the ID of the stream in which the data change has been dispatched. For a primary key constraint, the constraint ID may be the ID of the table to which the data change is directed. For a unique constraint, the constraint ID may be the ID of the unique constraint. For a foreign key, the constraint ID may be the ID of table which this foreign key refers to. A table may have one primary key constraint, zero or more unique constraints and zero or more foreign key constraints.

In one implementation, the hash table may be organized such that every constraint of a dispatched, but not yet committed, data change may have an entry in the hash table. The entry of the hash table may include a constraint pair (i.e., constraint hash value, constraint ID) where the constraint ID is the ID of the table to which the data change is directed, the unique constraint or the foreign-key-referenced table. The constraint hash value may include the hash value of the corresponding primary key column values, unique constraint column values or foreign key column values. Each entry in the hash table may also contain an ID of the stream where the corresponding data change is dispatched. In one implementation, all of the entries in the same bucket of the hash table may be double-linked together. As such, the entries which are hashed into the same bucket may be chained together by double-links (i.e., each entry has two pointers: one pointing to its next entry, and the other pointing to its previous entry). In another implementation, all of the entries in the hash table for the same stream may be linked into a stack. Each stream may have a pointer pointing to the top of this stack.

Referring back to step 350, if the replication application 60 does not find a matching entry in the hash table, the replication application 60 may proceed to step 360.

At step 360, the replication application 60 may dispatch the data change into multiple streams following the order as indicated in the log. In one implementation, the replication application 60 may dispatch the data change into a stream by hashing the hash value of the primary key into the stream ID. By hashing the hash value of the primary key into the stream ID, the replication application 60 may evenly distribute data changes into multiple streams. In one implementation, in order to evenly distribute data changes into multiple streams, the replication application 60 may use a mod operation to map the generated hash value to a stream ID. For example, in a replication system 200 that has 64 streams, if the replication application 60 generates a hash value of 123 for a particular data change, then the replication application 60 may map particular data change to the stream ID that is equal to 59 (i.e., 123% 64=59). After the current data change is dispatched, the replication application 60 may add the current data change's constraint ID, constraint hash value and stream ID into the hash table as a new entry.

Referring back to step 350, if the replication application 60 finds a matching entry in the hash table, the replication application 60 may determine that the data change in the matching entry and the current data change being evaluated are conflicting data changes. In one implementation, a matching entry may have the same constraint ID and the same constraint hash value as the data change being dispatched. After determining that the data changes are conflicting, the replication application 60 may proceed to step 370.

At step 370, the replication application 60 may dispatch the current data change being evaluated into the same stream where the matching entry's data change was dispatched to ensure that the data changes are performed in their original order. By dispatching the current data change into the same stream where the matching entry's data change was dispatched, the replication application 60 may ensure that no causal consistency constraint violations will occur when the data changes are applied to the destination site. In one implementation, each data change may be dispatched into a stream, then applied to the destination site and then committed at the destination site.

After the current data change is dispatched, the replication application 60 may add the current data change's constraint ID, constraint hash value and stream ID into the hash table as a new entry if the current data change's constraint value does not exist in any of the entries of the hash table. For example, the current data change may have two constraint hash values such that the first constraint hash value is listed in at least one entry in the hash table and the second constraint hash value is not listed in the hash table. Here, the replication application 60 may not add a new entry to the hash table for the first constraint hash value because the first constraint hash value is already listed in one entry in the hash table. However, the replication application 60 may add a new entry to the hash table for the second constraint hash value because the second constraint hash value does not exist in the hash table.

Dispatching a data change may include dispatching or transmitting the data change to a stream (i.e., putting a data change into a buffer for this stream). Applying the data change may include executing the buffered data change at the destination before the associated transaction has been committed. Committing the data change includes committing the associated transaction of the data change.

In one implementation, the current data change may conflict with more than one entry in the hash table. In this case, among the streams that have the conflicting data changes, the replication application 60 may throttle the stream containing the least number of data changes, and immediately apply and commit data changes of other streams. After applying and committing the data changes of the other streams, the replication application 60 may resume the throttled stream and dispatch the current data change into this stream. By throttling the stream of the current data change, the replication application 60 may ensure that the prior conflicting data changes may be applied at the destination before the current data change such that the data changes are performed at the destination in the correct order. In another implementation, the replication application 60 may delay or throttle the dispatch of the current data change until the data changes of all the matching hash table entries have been committed.

For example, suppose a table "tab1" has a primary key on column "k" and a foreign key column "x", referencing the primary key column "x" of the table "tab2." The source site may perform the following data changes:

```
...
delete from tab1 where k = k1 /* row (k1, . . . , x1, . . . ) is deleted*/
insert tab2 values (x2, . . . )
insert tab1 values (k1, . . . , x2, . . . )
...
```

In this implementation, if the "delete from tab1 where k=k1" data change is dispatched into Stream1 and the "insert tab2 values (x2, . . . )" data change is dispatched into Stream2, before dispatching the "insert tab1 values (k1, . . . , x2, . . . )" data change into a stream, the replication application 60 may find two matching entries in the hash table. Accordingly, the replication application 60 may dispatch the "insert tab1 values (k1, . . . , x2, . . . )" data change into Stream3 and stall or throttle the Stream3 until the data changes in Stream1 and Stream2 have been applied and the transactions for those streams have been committed. After the transactions have been committed, those committed entries may then be removed from the hash table, and the replication application 60 may then dispatch the "insert tab1 values (k1, . . . , x2, . . . )" data change into the stream which contained the least number of data changes. Although various implementations for dispatching data changes have been described in the preceding paragraphs, it should be noted that in any of the implementation described above, after the data changes are dispatched into one or more streams, the data changes may be delivered to the destination site in a single transaction and thus applied together.

Replicating Data Changes Atomically

In one implementation, when a batch of data changes is replicated, the replication application 60 either commits all of the data changes in the batch at the destination site or none of the data changes in the batch. In this manner, the replication application 60 ensures that the data at the destination site conforms to the data at the source site. Accordingly, when replicating a batch of data changes using multi-streaming, the replication application 60 may invoke a dispatcher thread to start a root transaction. In one implementation, the dispatcher thread may dispatch the data changes into a buffer of a stream 230. Each stream 230 may have a fixed buffer size that may hold data changes which have been dispatched to a corresponding stream but not yet applied at the destination site. After the dispatcher thread dispatches the data changes into the buffer of the stream 230 and before the data changes are applied at the destination site, each stream 230 may invoke a worker thread that may enlist a nested transaction related to the data changes in the buffer into the root transaction. Here, the root transaction may include multiple nested transactions such that all the nested transactions of the same root transaction may either all be committed or all be aborted. As such, it is not possible for some nested transactions to be committed while others are aborted.

In one implementation, a nested transaction may use locks when applying the data changes. Two different nested transactions of the same root transaction may use these locks to indicate that the two different nested transactions are not compatible with each other. For instance, after a first nested transaction has performed a data change, it may hold a lock on the piece of data related to the data change. Then, if a second nested transaction tries to make a conflicting data change on the same piece of data, the latter data change (i.e., by the second nested transaction) may be blocked until the prior nested transaction commits. Once the prior nested transaction commits, the prior nested transaction's locks may be transferred to the parent root transaction. As such, the latter data change may no longer conflict with the prior data change, and the latter nested transaction may resume. In one implementation, if the latter nested transaction is aborted, all the nested transactions of the same root transaction, including any previously committed nested transactions, may also be aborted.

In the previous example (i.e., "delete from tab1 where k=k1" data change is dispatched into Stream1), a constraint pair (table "tab1", has value k1) may already exists in the hash table. Here, if the "insert tab1 values (k1, . . . x2, . . . )" data change is dispatched into Stream1, a constraint pair (table "tab2", hash value x2) may be inserted into the hash table as a new entry and associated with Stream1. In order to ensure that the "insert tab2 values (x2, . . . )" data change, which has been applied via Stream2, is visible to Stream1, the replication application 60 may commit the nested transaction on Stream2. After committing the nested transaction on Stream2, the replication application 60 may transfer the locks of the nested transaction to the parent (i.e., the root transaction). As such, the "insert tab1 values (k1, . . . x2, . . . )" data change on Stream1 will not be blocked by these transferred locks.

In one implementation, a data change being dispatched to a stream may first be appended to the stream's buffer. After a stream's buffer becomes full, data changes in this buffer may then be applied to the destination site, and these data changes may then be removed from the buffer. In one implementation, the worker thread may apply data changes multiple times before committing its nested transaction. When a worker thread commits its nested transaction, the locks of this nested transaction are transferred to the parent (i.e., the root transaction). After this transfer, any later conflicting data changes will not be blocked by these locks.

After a worker thread commits its nested transaction for its stream, with all previous data changes in the stream thus being committed, the replication application 60 may then remove from the hash table all the entries for those data changes, which are linked in a stack. In one implementation, the hash table may include entries which are hashed into the same bucket and may then be chained together by double-links. The double-links in the bucket of the hash table may be used to efficiently remove an entry from the bucket. After the entries are removed from the hash table, the worker thread may start a new nested transaction and enlist it into the root transaction. Subsequent data changes dispatched into this worker thread's stream may be wrapped into this new nested transaction.

In one implementation, all log records of parallel nested transactions of the same root transaction may be linked into one single chain. This single chain may ensure that the nested transactions may be undone correctly in case of abort. Any failure of a nested transaction may abort all prior committed nested transactions of the same root transaction.

Deadlocks

Deadlocks may occur when the replication application 60 applies conflicting data changes to the destination site in multiple streams. In one implementation, deadlocks may not exist among data changes themselves given that (1) each data change modifies only one row; (2) any two conflicting data changes (involving the same constraint pair) are not scheduled simultaneously (i.e., one data change does not start until the prior conflicting data change has finished); and (3) for any two conflicting data changes, either they are dispatched into the same nested transaction, thus the same stream, or the prior conflicting data change should be committed by a prior nested transaction before the latter data change starts.

However, deadlocks may exist due to a lock escalation at the destination site or due to different lock granules being used between the source site and the destination site (e.g., row locks are disabled at the destination site, but enabled at the source site). Here, the replication application 60 may detect such types of deadlocks and abort the whole root transaction. The replication application 60 may then try to re-apply the whole batch using a different hash function of hashing primary key hash values into a stream ID to reduce the possibility of running into the same deadlock again. If the size of the hash table becomes a concern, the replication application 60 may increase the frequency of commit by committing a nested transaction after all current data changes in the buffer are applied. Once a worker thread commits its nested transaction, entries for the data changes included in this nested transaction may then be removed from the hash table. In one implementation, more frequent commits may also reduce the possibility of deadlocks.

In another implementation, the replication application 60 may reduce the number of commits by eliminating the commit which occurs when multiple matching entries are located in the hash table before dispatching the data change. Here, all the data changes in a batch may need to be pre-processed to identify clusters of conflicting data changes. Any two conflicting data changes may then be categorized into the same cluster. Data changes of the same cluster may then be dispatched into the same stream. Different clusters of data changes may be dispatched into the same stream and committed in the same nested transaction. This would reduce the total number of nested transactions, but the pre-processing of the data changes may require an extra-round of reading data changes which may degrade performance.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for distributing one or more replication commands, comprising:
    (a) receiving a log from a source database, wherein the log comprises the replication commands to be applied at a destination database;
    (b) generating a hash value for a constraint of one of the replication commands;
    (c) determining whether the hash value exists in a hash table of constraints of replication commands previously dispatched but not yet committed, the hash table storing hash values of constraints of replication commands and associated stream identifiers identifying which of a plurality of streams the associated replication command was transmitted;
    (d) when the generated hash value exists in the hash table, based on the associated stream identifier associated with the hash value previously stored in the hash table, dispatching the one of the replication commands into a same stream of the plurality of streams as the previously dispatched replication command, wherein the plurality of streams connects the source database to the destination database; and
    (e) when the generated hash value does not exist in the hash table, dispatching the one of the replication commands into one of the plurality of streams and storing the generated hash value in the hash table along with a stream identifier identifying the one of plurality of streams, wherein generating the hash value comprises:
        identifying the constraint for the one of the replication commands;
        identifying a constraint ID for the constraint;
        generating a constraint value for the constraint ID using a hash algorithm;
        concatenating the constraint value and the constraint ID into a binary string; and
        associating the binary string with the one of the replication commands.

2. The method of claim 1, wherein dispatching the one of the replication commands comprises:
    identifying a first entry in the table having the constraint ID and the constraint value for the one of the replication commands, wherein the table comprises a plurality of entries, each entry having a constraint ID, a constraint value and a stream ID for a previously dispatched replication command; and
    sending the one of the replication commands to the one of the plurality of streams that corresponds to the stream ID.

3. The method of claim 1, wherein dispatching the one of the replication commands comprises:
    starting a root transaction having multiple nested transactions;
    sending the one of the replication commands to a buffer of the one of the plurality of streams, wherein the buffer comprises one or more replication commands that have been dispatched but not yet applied at the destination database;
    enlisting a nested transaction related to the replication commands into the root transaction;
    applying the replication commands to the destination database;
    committing the nested transaction; and
    committing the root transaction at the destination database.

4. The method of claim 1, wherein dispatching the one of the replication commands into one of the plurality of streams comprises:
    searching for the constraint ID and the constraint value in the table having one or more entries, wherein each entry comprises information pertaining to a constraint ID and a constraint value for a previously dispatched replication command;
    determining that none of the entries in the table comprises the constraint ID and the constraint value for the one of the replication commands; and
    sending the one of the replication commands to any one of the plurality of streams.

5. The method of claim 4, further comprising storing the constraint ID and the constraint value for the one of the replication commands and a stream ID to an entry in the table, wherein the stream ID corresponds to the any one of the plurality of streams.

6. The method of claim 1, wherein dispatching the one of the replication commands comprises:
    identifying the constraint ID and the constraint value for the one of the replication commands in two or more entries in the table, wherein the table comprises a plurality of entries, each entry having a constraint ID, a constraint value and a stream ID for a previously dispatched replication command and wherein the two or more entries comprise two or more stream IDs that correspond to two or more streams in the plurality of streams for two or more previously dispatched replication commands;
    sending the one of the replication commands to the one of the plurality of streams;

throttling the one of the plurality of streams; and
committing a remainder of the plurality of streams.

7. The method of claim 1, further comprising repeating steps (a) to (d) for each one of the replication commands.

8. The method of claim 1, wherein the source database is a publisher.

9. The method of claim 1, wherein the destination database is a subscriber.

10. A computer-readable storage medium having stored thereon computer-executable instructions which, when executed by a computer, cause the computer to:
receive a log from a source database, wherein the log comprises the replication commands to be applied at a destination database;
generate a hash value for a constraint of one of the replication commands;
determine whether the hash value exists in a hash table of constraints of replication commands previously dispatched but not yet committed, the hash table storing hash values of constraints of replication commands and associated stream identifiers identifying which of a plurality of streams the associated replication command was transmitted;
when the generated hash value exists in the hash table, based on the associated stream identifier associated with the hash value previously stored in the hash table, dispatch the one of the replication commands into a same stream of the plurality of streams as the previously dispatched replication command, wherein the plurality of streams connects the source database to the destination database; and
when the generated hash value does not exist in the hash table, dispatch the one of the replication commands into one of the plurality of streams and storing the generated hash value in the hash table along with a stream identifier identifying the one of plurality of streams, wherein generating the hash value comprises:
identify the constraint for the one of the replication commands;
identify a constraint ID for the constraint;
generate a constraint value for the constraint ID using a hash algorithm;
concatenate the constraint value and the constraint ID into a binary string; and
associate the binary string with the one of the replication commands.

11. The computer-readable storage medium of claim 10, wherein the computer-executable instructions to dispatch the one of the replication commands comprise computer-executable instructions which, when executed by a computer, cause the computer to:
identify a first entry in a table having the constraint ID and the constraint value for the one of the replication commands, wherein the table comprises a plurality of entries, each entry having a constraint ID, a constraint value and a stream ID for a previously dispatched replication command; and
send the one of the replication commands to the one of the plurality of streams that corresponds to the stream ID.

12. The computer-readable storage medium of claim 11, wherein the computer-executable instructions further comprise computer-executable instructions which, when executed by a computer, cause the computer to store the constraint ID and the constraint value for the one of the replication commands and the stream ID to a second entry in the table.

13. A computer system, comprising:
at least one processor; and
a memory comprising program instructions that when executed by the at least one processor, cause the at least one processor to:
(a) receive a log from a source database, wherein the log comprises one or more replication commands to be applied at a destination database;
(b) generate one or more hash values for one of the replication commands comprising:
identify one or more constraints of the one of the replication commands;
create a constraint ID for each constraint;
generate a constraint value for each constraint ID using a hash algorithm;
concatenate the constraint value and the constraint ID into a binary string; and
associate the binary string with the one of the replication commands;
(c) identify one or more entries in a table having at least one of the hash values for the one of the replication commands, wherein the table comprises a plurality of entries, each entry having a hash value and a stream ID for a previously dispatched replication command;
(d) based on the stream ID for a previously dispatched replication command, dispatch the one of the replication commands to a same stream of a plurality of streams as the previously dispatched replication command, wherein the plurality of streams connects the source database to the destination database; and
(e) throttle the one of the plurality of streams.

14. The computer system of claim 13, wherein the memory further comprises program instructions that cause the at least one processor to store the hash values for the one of the replication commands and a stream ID that corresponds to the one of the plurality of streams to an entry in the table.

15. The computer system of claim 13, wherein the memory further comprises program instructions that cause the at least one processor to repeat steps (a) to (e) for each one of the replication commands.

* * * * *